United States Patent
Yamazaki (10) Patent No.: US 8,601,369 B2
(45) Date of Patent: Dec. 3, 2013

(54) IMAGE PROCESSING APPARATUS, IMAGE PROCESSING METHOD, AND IMAGE PROCESSING PROGRAM

(75) Inventor: Asuka Yamazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1008 days.

(21) Appl. No.: 12/017,253

(22) Filed: Jan. 21, 2008

(65) Prior Publication Data

US 2008/0180457 A1    Jul. 31, 2008

(30) Foreign Application Priority Data

Jan. 26, 2007   (JP) ................................ 2007-017011

(51) Int. Cl.
*G06F 17/00* (2006.01)
(52) U.S. Cl.
USPC .......................................... 715/255; 715/273
(58) Field of Classification Search
USPC ................................................ 715/255, 273
See application file for complete search history.

(56) References Cited

U.S. PATENT DOCUMENTS

| | | | | |
|---|---|---|---|---|
| 5,761,485 A | * | 6/1998 | Munyan ........................ | 715/839 |
| 6,111,586 A | * | 8/2000 | Ikeda et al. .................... | 345/619 |
| 6,122,069 A | * | 9/2000 | Kendall et al. ................. | 358/1.9 |
| 6,728,546 B1 | * | 4/2004 | Peterson et al. .............. | 455/462 |
| 7,210,093 B1 | * | 4/2007 | Dutta ............................. | 715/210 |
| 7,747,596 B2 | * | 6/2010 | Bigioi et al. ................... | 707/705 |
| 8,024,658 B1 | * | 9/2011 | Fagans et al. ................. | 715/730 |
| 2003/0103234 A1 | * | 6/2003 | Takabayashi et al. ....... | 358/1.15 |
| 2005/0055625 A1 | * | 3/2005 | Kloss .......................... | 715/500.1 |
| 2006/0103891 A1 | * | 5/2006 | Atkins .......................... | 358/450 |
| 2007/0118794 A1 | * | 5/2007 | Hollander et al. ............ | 715/512 |
| 2007/0297672 A1 | * | 12/2007 | Eschbach et al. ............ | 382/173 |

FOREIGN PATENT DOCUMENTS

| | | |
|---|---|---|
| JP | 2001-022734 A | 1/2001 |
| JP | 2004-013346 A | 1/2004 |
| JP | 2006-072858 A | 3/2006 |
| WO | WO0182231 A3 | 11/2001 |

OTHER PUBLICATIONS

Engst; iPhoto 5 for Mac OS X: Visual Quickstart Guide; Apr. 15, 2005; Peachpit Press; pp. 135-136, and 140.*

* cited by examiner

*Primary Examiner* — Andrew Dyer
(74) *Attorney, Agent, or Firm* — Canon USA, Inc., I.P. Division (57) ABSTRACT

An information processing apparatus displays in order multiple pages of the same electronic album in each of a first display area and a second display area arranged in parallel on a screen of a display device. A user selects one image from each display area. The information processing apparatus edits the selected images and display the results on the display device.

10 Claims, 12 Drawing Sheets

| PAGE | FIRST PAGE | | | | | SECOND PAGE | | | | |
|---|---|---|---|---|---|---|---|---|---|---|
| | IMAGE | IMAGE LOCATION | | IMAGE SIZE | | IMAGE | IMAGE LOCATION | | IMAGE SIZE | |
| | | X | Y | H | W | | X | Y | H | W |
| 1 | A | 10 | 10 | 500 | 300 | B | 10 | 250 | 100 | 50 |
| 2 | C | 10 | 10 | 500 | 300 | D | 80 | 250 | 100 | 50 |
| 3 | E | 10 | 10 | 500 | 300 | E | 10 | 250 | 100 | 50 |
| 4 | G | 10 | 10 | 500 | 300 | H | 80 | 250 | 100 | 50 |
| ... | ... | ... | ... | ... | ... | ... | ... | ... | ... | ... |
| 81 | S | 10 | 10 | 500 | 300 | T | 10 | 250 | 100 | 50 |
| 82 | U | 10 | 10 | 500 | 300 | V | 80 | 250 | 100 | 50 |
| 83 | W | 10 | 10 | 500 | 300 | X | 10 | 250 | 100 | 50 |
| 84 | Y | 10 | 10 | 500 | 300 | Z | 80 | 250 | 100 | 50 |
| ... | ... | ... | ... | ... | ... | ... | ... | ... | ... | ... |

FIG. 7B

| PAGE | FIRST PAGE | | | | | SECOND PAGE | | | | |
|---|---|---|---|---|---|---|---|---|---|---|
| | IMAGE | IMAGE LOCATION | | IMAGE SIZE | | IMAGE | IMAGE LOCATION | | IMAGE SIZE | |
| | | X | Y | H | W | | X | Y | H | W |
| 1 | A | 10 | 10 | 500 | 300 | B | 10 | 250 | 100 | 50 |
| 2 | C | 10 | 10 | 500 | 300 | S | 50 | 180 | 500 | 300 |
| 3 | E | 10 | 10 | 500 | 300 | E | 10 | 250 | 100 | 50 |
| 4 | G | 10 | 10 | 500 | 300 | H | 80 | 250 | 100 | 50 |
| ... | ... | ... | ... | ... | ... | ... | ... | ... | ... | ... |
| 81 | D | 10 | 10 | 100 | 50 | T | 10 | 250 | 100 | 50 |
| 82 | U | 10 | 10 | 500 | 300 | V | 80 | 250 | 100 | 50 |
| 83 | W | 10 | 10 | 500 | 300 | X | 10 | 250 | 100 | 50 |
| 84 | Y | 10 | 10 | 500 | 300 | Z | 80 | 250 | 100 | 50 |
| ... | ... | ... | ... | ... | ... | ... | ... | ... | ... | ... |

| PAGE | FIRST IMAGE | | | | | SECOND IMAGE | | | | |
|---|---|---|---|---|---|---|---|---|---|---|
| | IMAGE | IMAGE LOCATION | | IMAGE SIZE | | ROTA-TION | IMAGE | IMAGE LOCATION | | IMAGE SIZE | | ROTA-TION |

| PAGE | IMAGE | X | Y | H | W | ROT | IMAGE | X | Y | H | W | ROT |
|---|---|---|---|---|---|---|---|---|---|---|---|---|
| 1 | A | 10 | 10 | 500 | 300 | 0 | B | 10 | 250 | 100 | 50 | 0 |
| 2 | C | 10 | 10 | 500 | 300 | 90 | D | 80 | 250 | 100 | 50 | 90 |
| 3 | E | 10 | 10 | 500 | 300 | 180 | E | 10 | 250 | 100 | 50 | 180 |
| 4 | G | 10 | 10 | 500 | 300 | 270 | H | 80 | 250 | 100 | 50 | 270 |
| ... | ... | ... | ... | ... | ... | ... | ... | ... | ... | ... | ... | |
| 81 | S | 10 | 10 | 500 | 300 | 0 | T | 10 | 250 | 100 | 50 | 0 |
| 82 | U | 10 | 10 | 500 | 300 | 0 | V | 80 | 250 | 100 | 50 | 0 |
| 83 | W | 10 | 10 | 500 | 300 | 0 | X | 10 | 250 | 100 | 50 | 270 |
| 84 | Y | 10 | 10 | 500 | 300 | 90 | Z | 80 | 250 | 100 | 50 | 0 |
| ... | ... | ... | ... | ... | ... | ... | ... | ... | ... | ... | ... | |

FIG. 11B

| PAGE | IMAGE | X | Y | H | W | ROT | IMAGE | X | Y | H | W | ROT |
|---|---|---|---|---|---|---|---|---|---|---|---|---|
| 1 | A | 10 | 10 | 500 | 300 | 0 | B | 10 | 250 | 100 | 50 | 0 |
| 2 | C | 10 | 10 | 500 | 300 | 90 | S | 80 | 250 | 100 | 50 | 90 |
| 3 | E | 10 | 10 | 500 | 300 | 180 | E | 10 | 250 | 100 | 50 | 180 |
| 4 | G | 10 | 10 | 500 | 300 | 270 | H | 80 | 250 | 100 | 50 | 270 |
| ... | ... | ... | ... | ... | ... | ... | ... | ... | ... | ... | ... | |
| 81 | D | 10 | 10 | 500 | 300 | 0 | T | 10 | 250 | 100 | 50 | 0 |
| 82 | U | 10 | 10 | 500 | 300 | | V | 80 | 250 | 100 | 50 | 0 |
| 83 | W | 10 | 10 | 500 | 300 | | X | 10 | 250 | 100 | 50 | 270 |
| 84 | Y | 10 | 10 | 500 | 300 | | Z | 80 | 250 | 100 | 50 | 0 |
| ... | ... | ... | ... | ... | ... | | ... | ... | ... | ... | ... | |

FIG. 12

IMAGE PROCESSING APPARATUS, IMAGE PROCESSING METHOD, AND IMAGE PROCESSING PROGRAM

BACKGROUND OF THE INVENTION

1. Field of the Invention

The present invention relates to an image processing apparatus, an image processing method, and an image processing program to edit and display a plurality of photographs, graphics, and the like.

2. Description of the Related Art

In recent years, management of multiple images in an electronic album is being carried out. As a procedure for creating an electronic album, first, a user's computer takes in images sensed with a digital camera. The user then selects several desired images from among these downloaded images and arranges them in a desired layout, by which the electronic album is created (see, for example, JP-2003-532205-A).

Then, when the computer has displayed the electronic album images and the user wants to replace one image with another image, a method is also known in which the user drags the replacing image to the location of the image to be replaced and drops it there (drag-and-drop) (see, for example, JP-2006-072858-A).

However, when replacing an image while displaying the electronic album images, the following problems arise when the replacing image and the image to be replaced are laid out in widely separated locations within the electronic album.

Namely, in the conventionally proposed method, because the area of the electronic album that is displayed in the display is limited, in order for the user to check and select each image he or she must repeatedly scroll through the image display area, which makes the task harder. Moreover, after exchanging the images it can be difficult to know which images have been exchanged.

In addition, the same problem occurs outside the exchange of images as well, such as when carrying out color correction or other such trimming of images while comparing images laid out at widely separated locations in the electronic album.

SUMMARY OF THE INVENTION

The present invention has been made in consideration of the above situation, and has as its object to enable a replacing image and an image to be replaced to be readily recognized and selected when replacing an image arranged in an electronic album or the like.

According to the present invention, the foregoing object is attained by providing an information processing apparatus that arranges and displays on a display device a plurality of images arranged in multiple pages of an electronic album, comprising: a detection unit that detects a switch to a predetermined editing mode; and a display controller that, when said switch is detected, displays said plurality of images aligned in order on said multiple pages contained in said electronic album in each of a first display area and a second display area, said first display area and said second display area arranged so as to be mutually parallel on said display device.

According to the present invention, the foregoing object is also attained by providing an information processing method of arranging and displaying on a display device a plurality of images arranged in multiple pages of an electronic album, comprising: detecting a switch to a predetermined editing mode; and displaying, when said switch is detected, said plurality of images aligned in order on said multiple pages contained in said electronic album in each of a first display area and a second display area, said first display area and said second display area arranged so as to be mutually parallel on said display device.

Further features of the present invention will become apparent from the following description of exemplary embodiments (with reference to the attached drawings).

DESCRIPTION OF THE EMBODIMENTS

Preferred embodiments of the present invention will be described in detail in accordance with the accompanying drawings.

Figure 1:
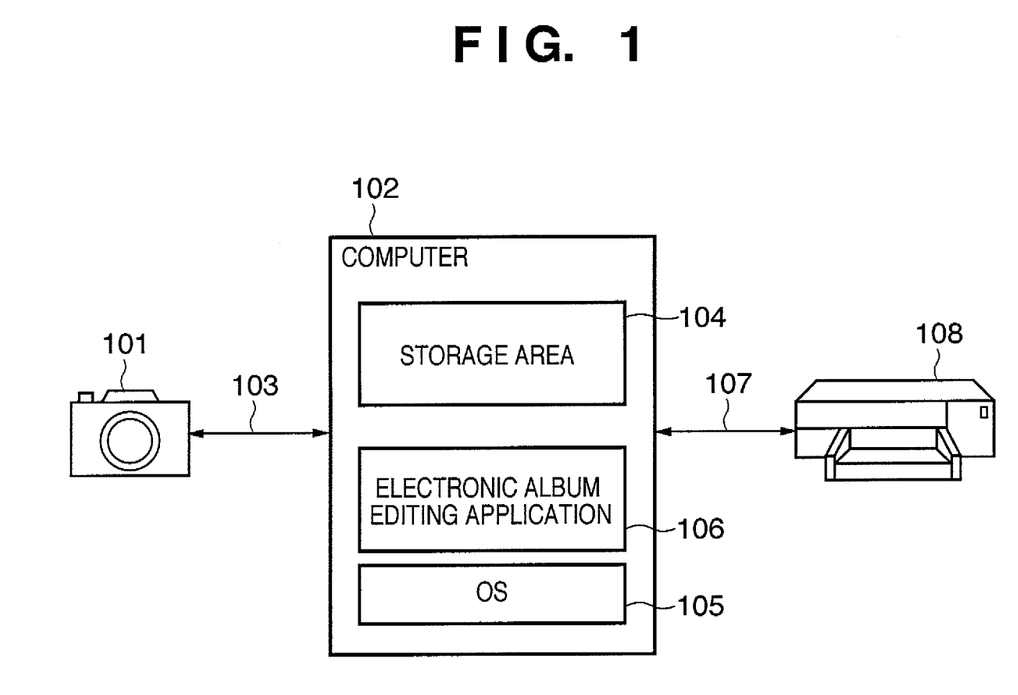
FIG. 1 is a schematic diagram illustrating a configuration of an image processing system using an image processing apparatus according to embodiments of the present invention.

FIG. 1 is a diagram illustrating schematically one example of a configuration of an image processing system using an image processing apparatus according to embodiments of the present invention.

In FIG. 1, an image input device 101 is an electronic device that converts an optical image that is image information into electric signals, performs certain image processing of those electrical signals to create image data, and records and plays back the image-processed image data. As the image input device 101, for example, a digital still camera that senses an object and records the sensed object as a still image, or a digital video camera that stores a sensed object as a moving image can be used. Of course, a scanner or the like that scans a document and outputs the scanned document as a still image can also be used.

A data transfer interface cable 103 is an interface cable for transferring image data that the image input device 101 inputs to a client computer 102. A wire interface cable typified by USB (Universal Serial Bus) or IEEE 1394, for example, can be used as the data transfer interface cable 103. Of course, it is also possible to use a wireless interface, typified by IrDA (Infrared Data Association) or Bluetooth®.

The computer 102 carries out processes such as editing the image data transferred from the image input device 101 via the data transfer interface cable 103 and creating an electronic album. The image processing apparatus according to the present invention is implemented by the computer 102.

The image data transferred from the image input device 101 via the data transfer interface cable 103 is stored in a storage area 104 of a storage device with which the computer 102 is provided. The storage area 104 is set, for example, in a hard disk drive (HDD) that comprises the storage device. The transfer of image data is, for example, carried out in accordance with a transfer command issued to the computer 102 from the image input device 101, after the computer 102 secures the storage area 104 in the storage device.

The image data stored in the storage area 104 is read out by a CPU of the computer 102 executing an operating system (OS) 105 and an electronic album editing application 106 installed in the computer 102.

The user, using the electronic album editing application 106 of the computer 102, edits images of the image data stored in the storage area 104 and creates an electronic album. A detailed description of a method of creating the electronic album is deferred. Thereafter, the computer 102 can save the created electronic album, as well as display and/or print it by transmission to an output apparatus 108.

A data transfer interface cable 107 is an interface cable for transferring to the output apparatus 108 data such as the electronic album that the computer 102 has created. A wire interface cable typified by USB (Universal Serial Bus) or IEEE 1394, for example, can be used as the data transfer interface cable 107. Of course, it is also possible to use a wireless interface, typified by IrDA (Infrared Data Association) or Bluetooth®. Where the output apparatus 108 is a printer, it carries out printing based on the image data of the electronic album created in accordance with control by the computer 102 and outputs printed matter.

Figure 2:
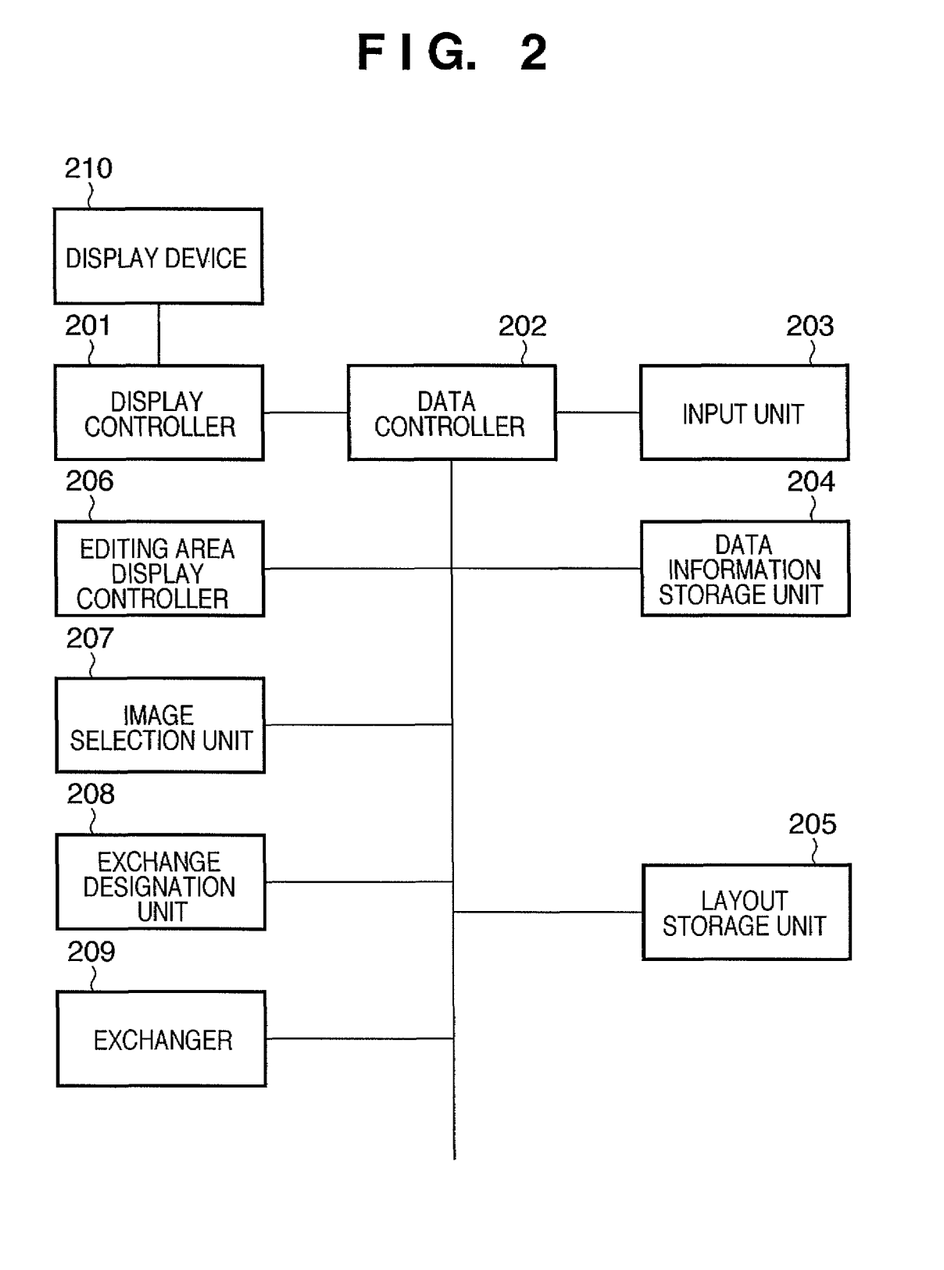
FIG. 2 is a diagram showing an example of a functional configuration of an electronic album editing application that runs on the image processing apparatus according to embodiments of the present invention.

FIG. 2 is a block diagram showing an example of a functional configuration of an electronic album editing application running on the image processing apparatus (computer 102) according to embodiments of the present application.

In FIG. 2, a data controller 202 creates electronic album data, display data, print data and the like, and also controls a data information storage unit 204. Further, the data controller 202 controls an editing area display controller 206, an image selection unit 207, an exchange designation unit 208, and an exchanger 209. The data controller 202 includes for example a CPU, and exerts overall control of the image processing apparatus (computer 102) according to the present embodiment.

In the data information storage unit 204, electronic album data containing image data of images selected by a user, their image sensing information, and information relating to their display, such as data position, image size, memo, frame, rotation, trimming, and background, is stored. These selections are executed by manipulation of a mouse or the like included in an input unit 203.

A display controller 201 outputs a graphic user interface (hereinafter "GUI") manipulated by the user and display data created by the data controller 202 to a display device 210.

Multiple different types of electronic album layout templates may be stored in a layout storage unit 205.

As the first step in the creation of an electronic album, all the data of the layouts stored in the layout storage unit 205 is displayed on the above-described display device 210 through the display controller 201. Then, using the input unit 203, the user selects from among the displayed layouts a layout to be employed. Information on the selected layout is then stored in the data information storage unit 204 by control of the data controller 202. Thereafter, the data controller 202, through the display controller 201, displays an electronic album GUI screen on the display device 210, which makes it possible for the user to create and edit an electronic album using the input unit 203.

In accordance with the content of the manipulation of the input unit 203 by the user, the data controller 202 revises the electronic album data stored in the data information storage unit as well as creates display data that it then causes the display controller 201 to display on the display device 210. The data controller 202 generates electronic album data, display data, print data and the like based on the layout information stored in the layout storage unit 205.

It should be noted that the data information storage unit 204 and the layout storage unit 205 are set in a HDD or other such storage device, not shown, and the functions shown in FIG. 2 are implemented by the CPU contained in the data controller 202 executing the various programs stored in that storage device.

Figure 3:
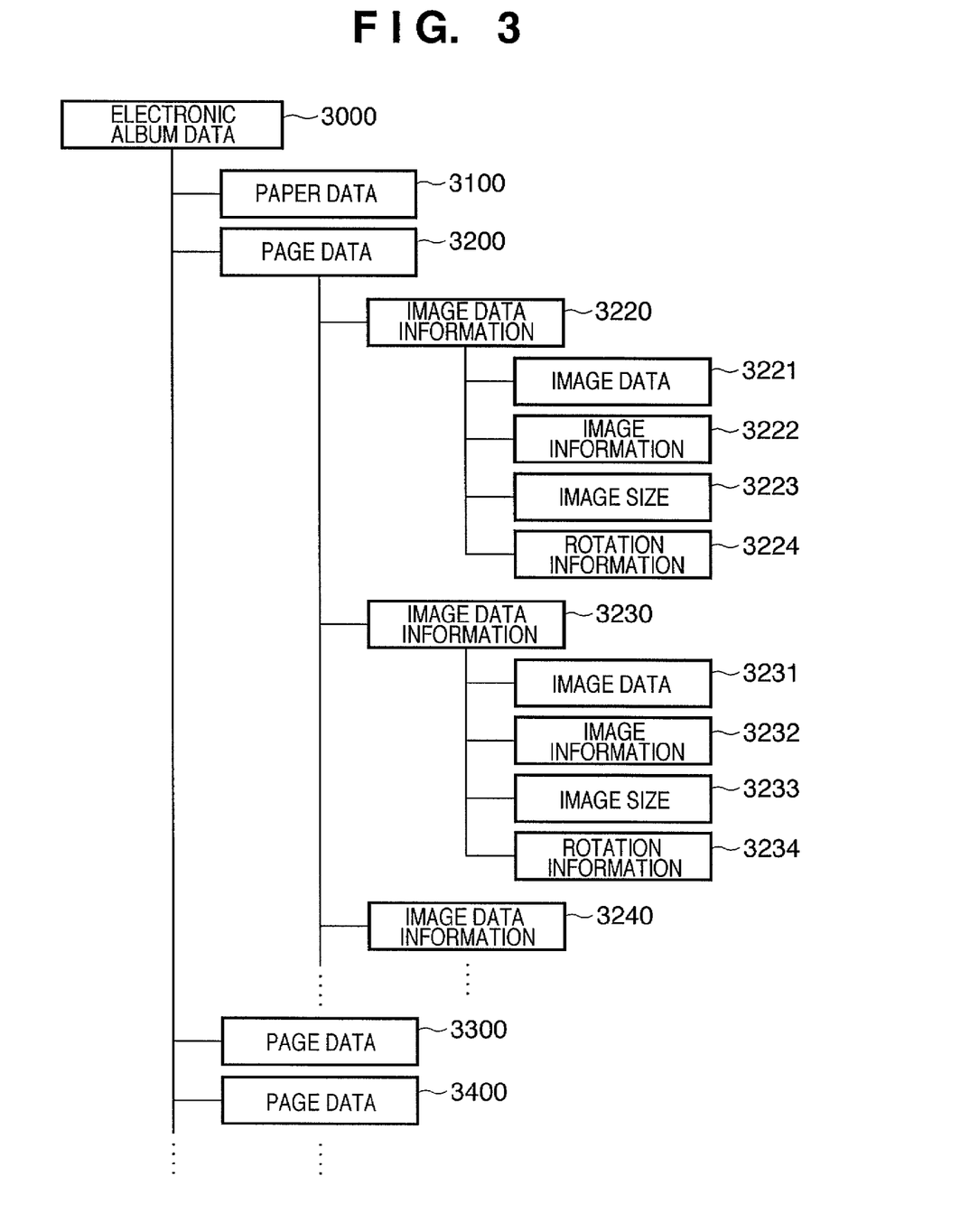
FIG. 3 is a diagram showing an example of an electronic album used in the image processing apparatus according to embodiments of the present invention.

FIG. 3 shows one example of in what kind of relation is the electronic album data stored in the data information storage unit 204. In electronic album data 3000, electronic album paper data 3100 and data per page are stored as page data (3200, 3300, 3400 . . . ). That is, there is as much page data (3200, 3300, 3400 . . . ) as there are pages contained in the electronic album. In the paper data 3100 include electronic album paper size and paper orientation (portrait and landscape). The page data (3200, 3300, 3400 . . . ) contains image data information (3220, 3230, 3240 . . . ) relating to each of the images on the pages. That is, there is as much image data information as there are images contained in the pages.

Information relating to individual pieces of image data 3221, image information according thereto 3222, and information relating to image size 3223 and rotation information 3224 are contained in the image data information 3220. In addition, an image ID for uniquely identifying the image data is assigned to the image data information 3220. The image data 3221 is an image selected from among the image data stored in the storage area 104 by the image selection unit 207 having received a user instruction. It should be noted that in the image data 3221 the image data itself or a file path to the image data itself is stored.

With the electronic album editing application 106, changes in the image size and the location where it is displayed in the page, rotation of the image, trimming, and a memo can be attached to the image as attribute information. Accordingly, image sensing information for the image data 3221 is stored in the image information 3222 together with the data display location, trimming information, and memo, the size of the image is stored in the image size 3223, and information on the rotation of the image is stored in the rotation information 3224. These are revised by the data controller 202 each time the image is selected and edited by the user operating the input unit 203 and the revisions immediately reflected in the electronic album data and the display data.

Information relating to individual pieces of image data 3231, image information according thereto 3232, and information relating to image size 3233 and rotation information 3234 are contained in the image data information 3230. The description above regarding elements 3221, 3222, 3223 and 3224 applies substantially to elements 3231, 3232, 3233 and 3234, respectively.

Figure 4:
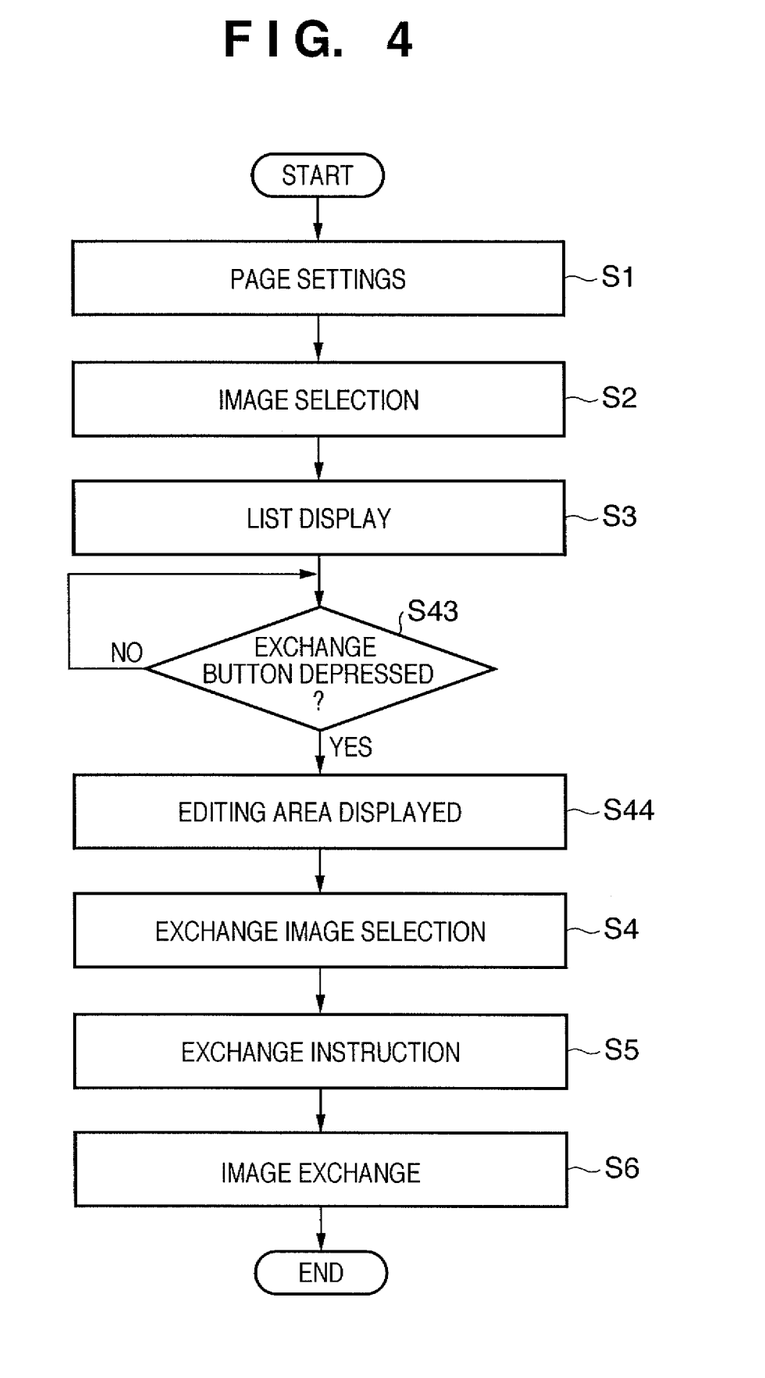
FIG. 4 is a flow chart illustrating image exchange processing according to a first embodiment of the present invention.

FIG. 4 is a flow chart illustrating a procedure for exchanging an image in the electronic album by running the electronic album editing application 106 on the image processing apparatus (computer 102) according to the present embodiments. Basically, this operating procedure is executed by the data controller 202 controlling the modules shown in FIG. 2.

First, in step S1, based on an operation of the user using the input unit 203, the electronic album editing application 106 is opened and the layout of the electronic album is set. The layout set here may, for example, be the paper size, the paper orientation, the background, the size and location of the frame, and so forth. Then, the set layout data is stored as the paper data 3100 of the electronic album data 3000 stored in the data information storage unit 204.

In step S2, the image data taken into the storage area 104 of the computer 102 previously is displayed on the display device 210 by control of the editing area display controller 206 and the display controller 201. The user selects an image to arrange in the electronic album and edit with the input unit 203 while viewing a screen showing a list of this image data. Having received the selection operation of the user, selection of the image data is then executed by the image selection unit 207. The image data, the image information, the image size and rotation information of the selected image are each then stored as image data information 3220 of the electronic album data 3000.

In step S3, display data is created by the data controller 202 based on the electronic album data 3000. Then, based on the display data, an album editing screen is displayed on the display device 210 by control of the editing area display controller 206 and the display controller 201.

In step S43, a switch to an image exchange mode according to whether or not the user has used the input unit 203 and pressed an exchange button described later on the album editing screen is detected.

Figure 5:
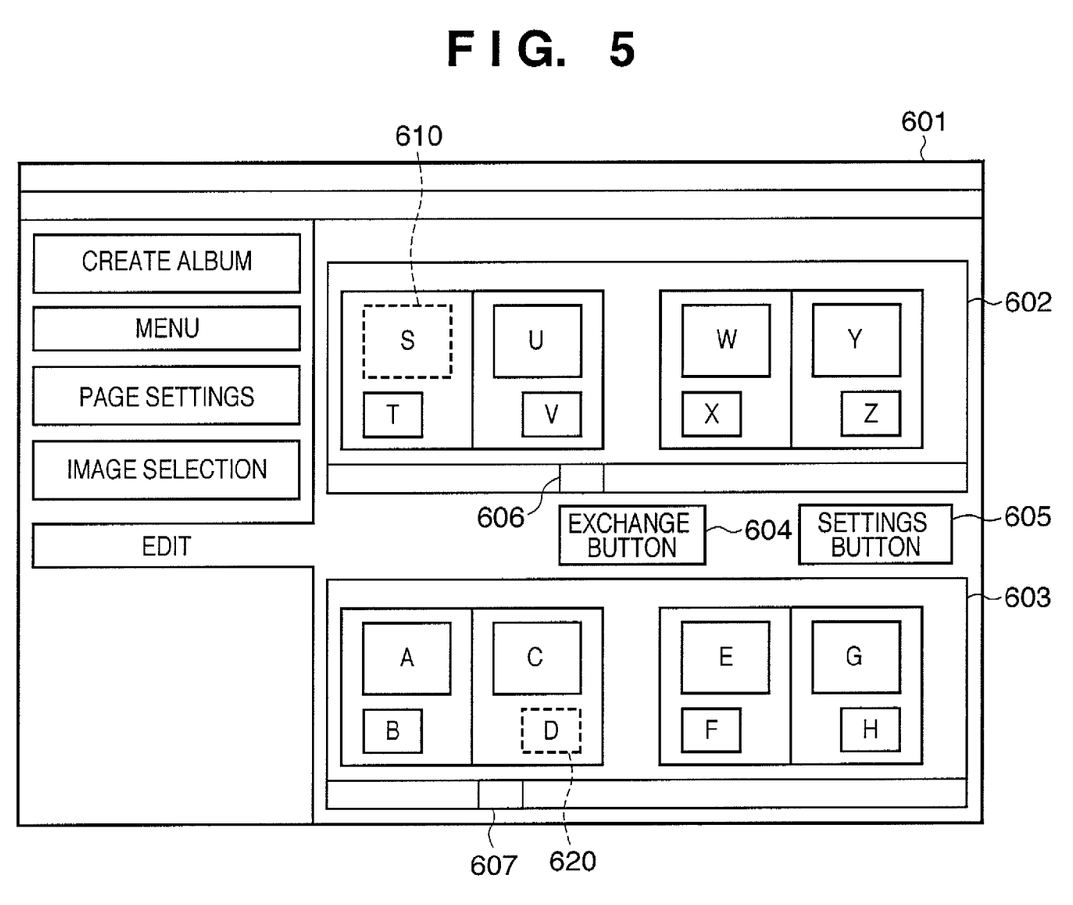
FIG. 5 is a diagram showing a GUI screen before image exchange processing according to the first embodiment of the present invention.

In the event that it is detected that the exchange button has been pressed, in step S44 a GUI screen 601 like that shown in FIG. 5 is displayed that includes two areas, a first page editing area 602 and a second page editing area 603, which are displayed adjacently.

The first page editing area 602 and the second page editing area 603 each displays a list of several electronic album pages, displaying pages contained in the same electronic album. In addition, the first page editing area 602 and the second page editing area 603 displayed adjacently can be scrolled independently by clicking on and moving a page scroll knob 606 or 607 horizontally, as a result of which different pages in the same album can be displayed.

In step S4, from among the images displayed in the first page editing area 602 and the second page editing area 603, the images to be exchanged are each selected with the image selection unit 207. Specifically, exchange is executed by clicking the two images that the user wants to exchange with a mouse of the input unit 203. As the image selection unit 207, selection of the images may also be accomplished using a keyboard of the input unit 203.

In the example shown in FIG. 5, an image S 610 is selected from a page displayed in the first page editing area 602 and an image D 620 is selected from a page displayed in the second page editing area 603. In addition to the scroll knob 606 or 607, scrolling can also be carried out by pressing an arrow key on the keyboard of the input unit 203. Where the first page editing area 602 and the second page editing area 603 are displayed adjacently vertically, each is scrolled vertically.

In step S5, an exchange instruction from the input unit 203 is received. In other words, in FIG. 5, by the user clicking an exchange button 604 with the mouse of the input unit 203, an exchange instruction is received at the exchange designation unit 208. Processing then proceeds to step S6 and a process of exchanging the images is executed in accordance with the function of the exchanger 209.

Figure 6:
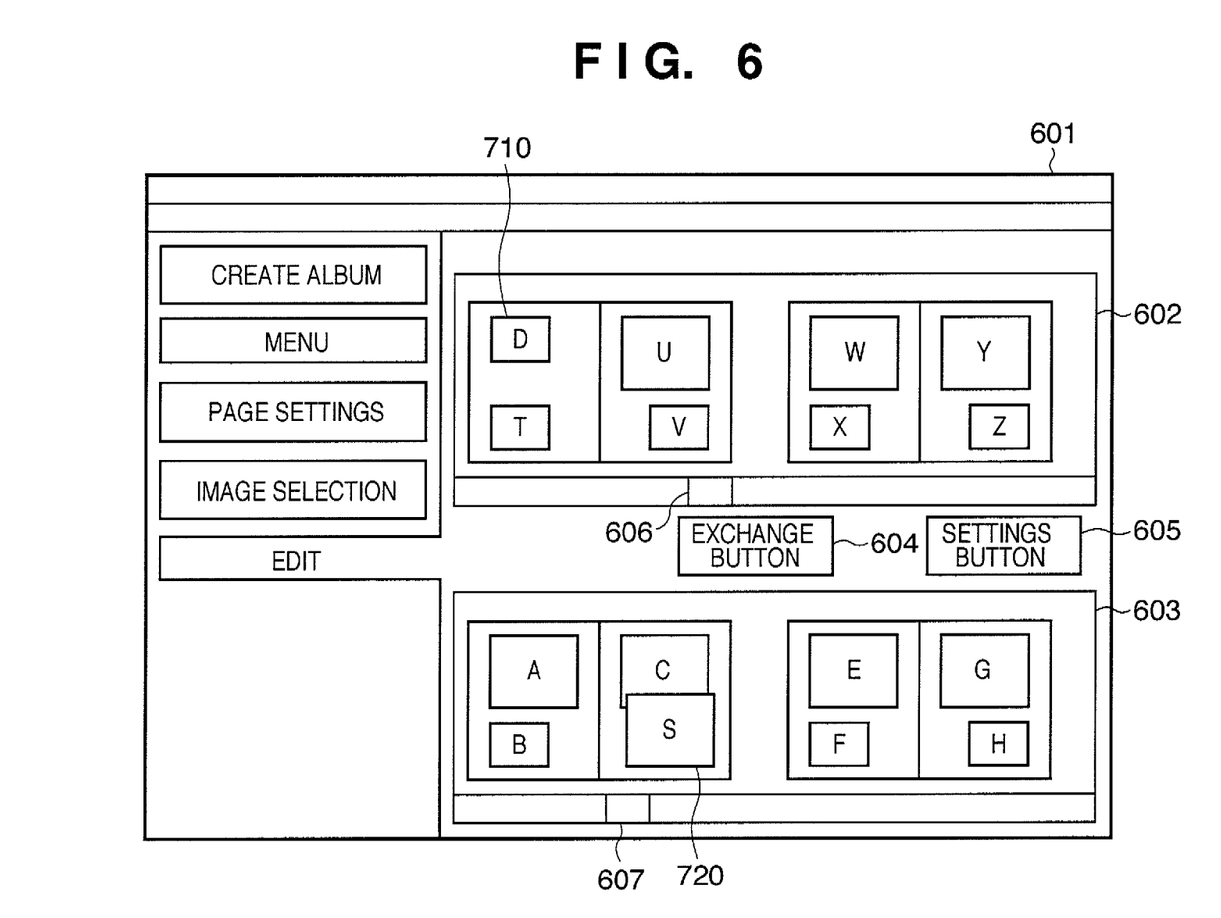
FIG. 6 is a diagram showing a GUI screen after image exchange processing according to the first embodiment of the present invention.

In the example shown in FIG. 5, since the image S 610 and the image D 620 have been selected as the images to be exchanged, the GUI screen 601 displayed by the editing area display controller 206 through the exchange process becomes as shown in FIG. 6. It should be noted that, during the exchange process, the sizes of the images are retained as is. In other words, the size of an image S 720 in the second page editing area 603 and the size of an image D 710 in the first page editing area 602 after exchange are the same as the size of the image S 610 in the first page editing area 603 and the size of the image D 620 in the second page editing area 602 before exchange. The operations involved in the foregoing exchange process are described in greater detail with reference to FIG. 7A and FIG. 7B.

Figure 7A:
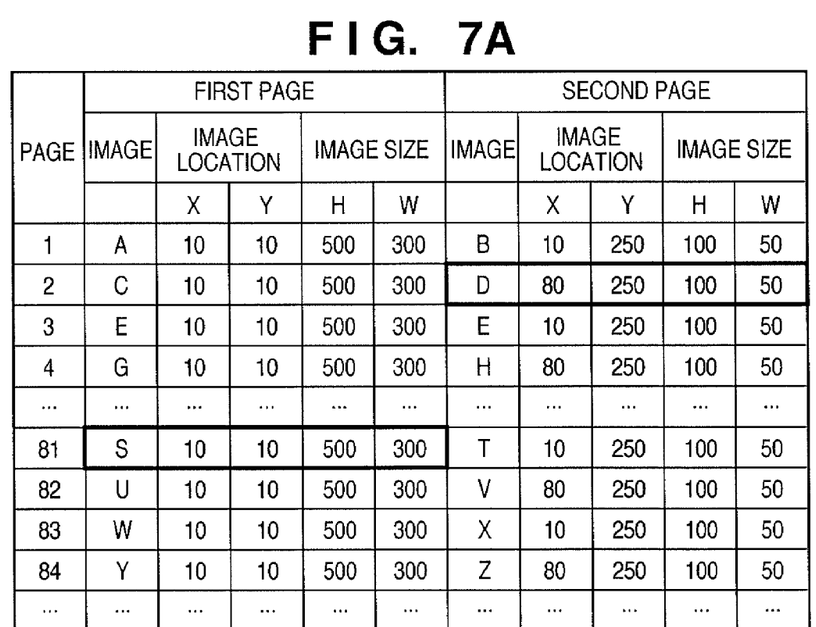
FIGS. 7A and 7B are diagrams showing examples of information management table structures according to the first embodiment of the present invention.
Figure 7B:
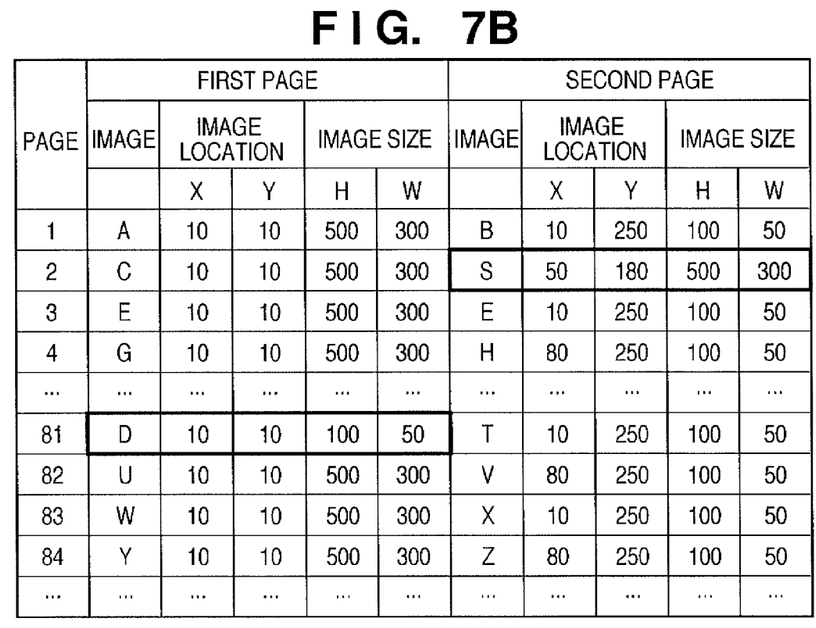

FIG. 7A and FIG. 7B are information tables of the electronic album data 3000 according to the images of the pages contained in the data information storage unit 204, holding information on the location of each image on the page and the image size. The location consists of an upper left corner coordinate and a lower right corner coordinate of the page. In FIGS. 7A and 7B only the upper left corner coordinate is shown, although the lower right corner coordinate is similarly contained in the information tables. FIG. 7A shows the state of the information table before exchange, in which information pertaining to images S, T, . . . displayed in the first page editing area 602 shown in FIG. 5 and information pertaining to images A, B, C, D, . . . displayed in the second page editing area 603 shown in FIG. 5 is contained. In the example shown in FIG. 7A, image D is in page 2 before exchange and image S is in page 81. When the exchange instruction is received in step S5, processing proceeds to step S6 and the contents of the information table are revised as a process of the data controller 202.

Specifically, first, the image ID and the image size are exchanged based on the page in the electronic album and the order in that page and the information table is revised.

At this time, in the present embodiment, in principle each image retains the upper left corner coordinate of the other from before the exchange. Then, in the present embodiment, since the images sizes before exchange are kept as is and the exchange carried out, a new lower right corner coordinate is obtained in accordance with the image size after exchange and the information table is revised.

By contrast, where the size of the image after exchange is the larger, attempting to arrange the image in keeping with the upper left corner coordinate of the image before exchange can result in the image sticking out from the page after exchange. Accordingly, where it is detected that the lower right corner coordinate thus obtained is a value that is outside the page, the lower right corner coordinate is inherited instead of the upper left corner coordinate, a new upper left corner coordinate is obtained in accordance with the image size after exchange, and the information table is revised.

Then, the image processing apparatus (computer 102) checks the revised information table, acquires image data based on the image ID, and in accordance with the size and the coordinates displays the electronic album on the display device 210.

The revision results change as shown in FIG. 7B. In other words, the image D that was the second image in page 2 is exchanged with the image S that was the first image in page 81, with the image S appearing as the second image in page 2 and the image D appearing as the first image in page 81. Reflecting the state of the table shown in FIG. 7B, through the data controller 202 and the display controller 201 the electronic album is displayed on the display device 210 as shown in FIG. 6, thus ending the exchange process performed by the exchanger 209.

It should be noted that, in step S43, further, the number of pages in the electronic album at the time the exchange button is depressed may also be detected, such that, where the number of pages detected exceeds a predetermined number, as described above, in step S44 the editing area may be divided and displayed, and where the number of pages detected is less than a predetermined number, a single editing area may be displayed as is, without dividing the editing area. Where such an arrangement permits all the pages to be displayed in a single editing area without adversely affect usability, the process of dividing the edition area for display can be omitted. In addition, the predetermined number is a number of pages that can be displayed on the screen, and is set in advance in accordance with the size of the screen.

Moreover, in step S44 the starting page and the ending page may differ between the first page editing area and the second page editing area. Thus, for example, in the first page editing area the pages of the electronic album may be displayed in order starting with page 1, while in the second page editing area the pages of the electronic album may be displayed in order starting with page 15. In this case also, although all the pages of the electronic album can be displayed in the first page editing area and in the second page editing area by scrolling, offsetting the pages displayed in advance can reduce the burden on the user.

In addition, in the present embodiment, as the electronic album editing mode that is detected in step S43 a description is given of a mode that switches images in the same electronic album. Alternatively, however, the electronic album editing mode is also applicable to such additional editing processes as color correction, trimming, and so forth. All such processes are arranged so as to enable editing to be done while comparing images in the electronic album, thus improving usability.

Thus, as described above, the first embodiment of the present invention enables selection of images on a GUI screen 601 that contains two editing areas, the first page editing area 602 and the second page editing area 603, and which is displayed on the display device 210, thus enabling a process of exchanging images to be exchanged by the exchanger 209 to be executed simply and easily.

(Second Embodiment)

Next, in a second embodiment, a description is given of being able to select a mode that exchanges only image data, and maintains the state of the attribute information, such as the size of the image and its rotation, in the same state as before exchange. The following description omits those portions that are the same as those of the first embodiment described above and concentrates on the distinctive features of the second embodiment.

Figure 8:
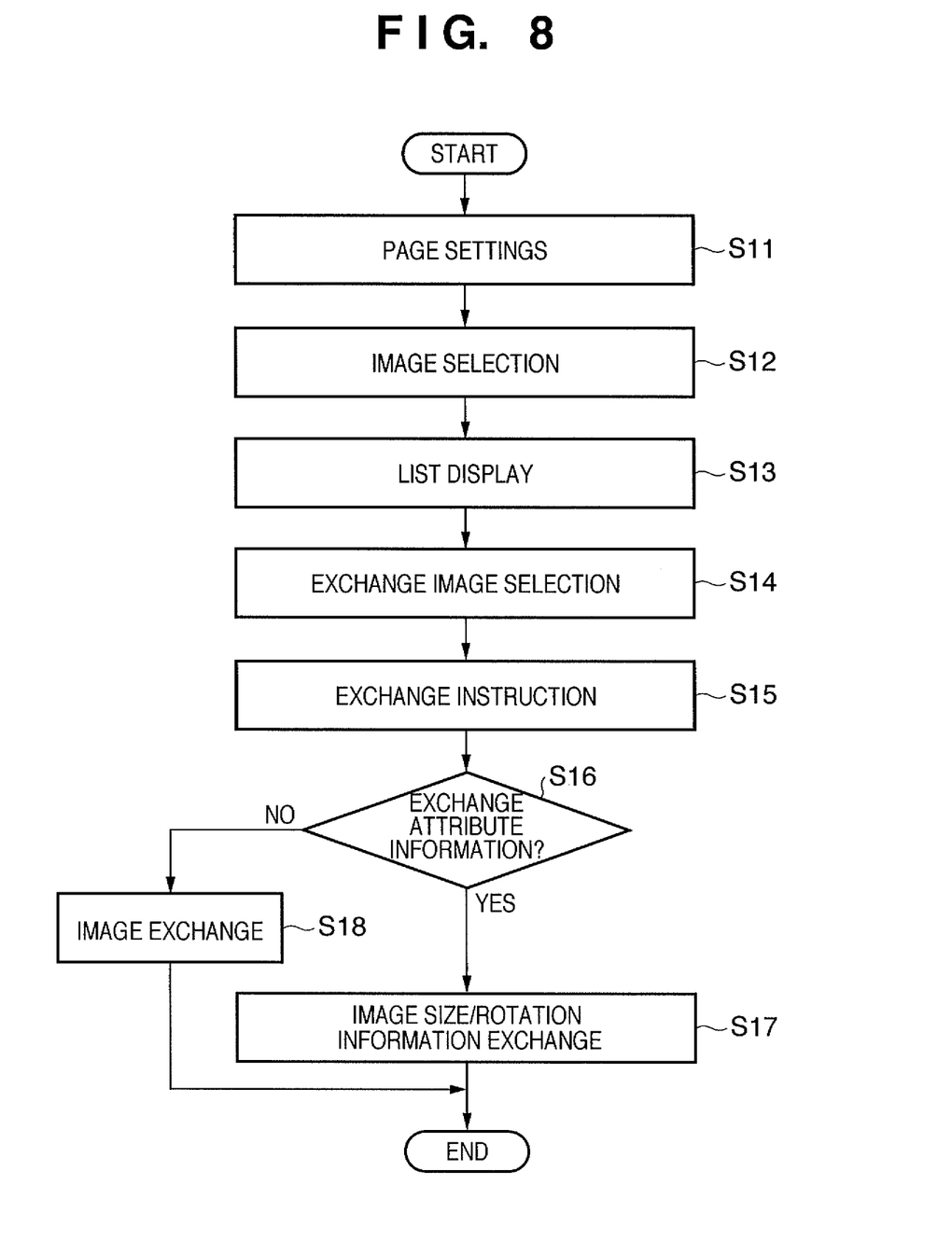
FIG. 8 is a flow chart illustrating image exchange processing according to a second embodiment of the present invention.

A description is now given of operations of the image processing apparatus (computer 102) according to a second embodiment of the present invention, with reference to the flow chart shown in FIG. 8. Steps S11 through S14 are the same as steps S1 through S4 shown in FIG. 3 of the first embodiment.

Figure 9:
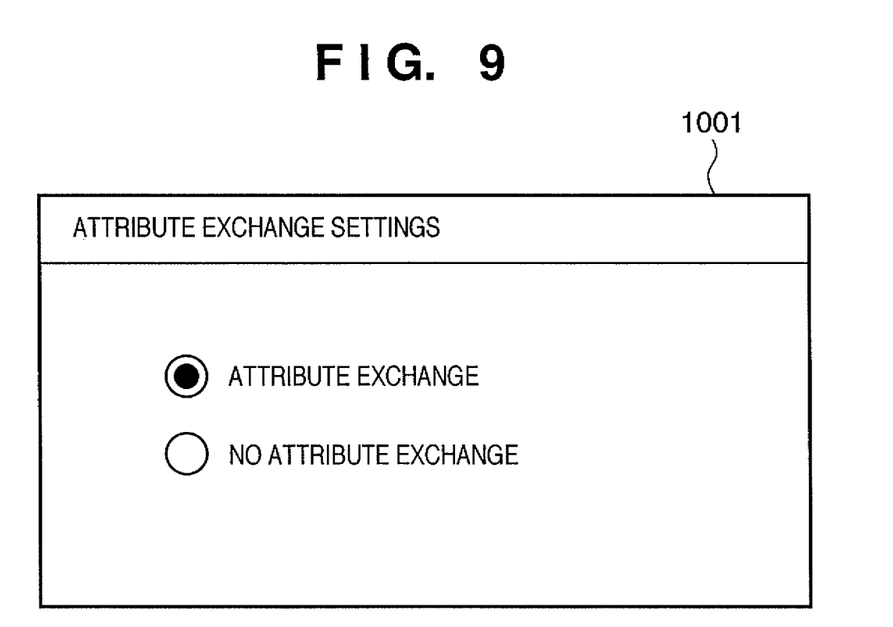
FIG. 9 is a diagram showing an example of an attribute information setting dialog box according to the second embodiment of the present invention.

In step S15, for example, in response to a click by the user of the settings button 605 in the GUI screen 601 shown in FIG. 5 with a mouse or the like of the input unit 203, an attribute exchange setting dialog box 1001 like that shown in FIG. 9 is displayed on the display device 210. The user can select with the input unit 203 either "attribute information exchange", to exchange and display such attribute information as image size and rotation together with exchange of image location, or "no attribute information exchange", to not exchange attribute information when exchanging the location of the image. The attribute exchange setting dialog box 1001 may be displayed by clicking the setting button 605 with the mouse of the input unit 203 as described above, or it may be displayed each time the exchange button 604, which is the exchange designation unit 208, is clicked, When the user selects "no attribute information exchange" using the input unit 203, the same operations as those of the exchange process described with respect to the first embodiment are carried out. In other words, when "no attribute information exchange" is identified in step S16, processing proceeds to step S18 and the image ID, image size, and rotation information stored in the information table of the electronic album data 3000 is exchanged to the data information storage unit 204.

By contrast, when the user selects "attribute information exchange", "attribute information exchange" is identified in step S16 and processing proceeds to step S17. In step S17, the image IDs stored in the information table are exchanged between the images to be exchanged and revised.

Figure 10:
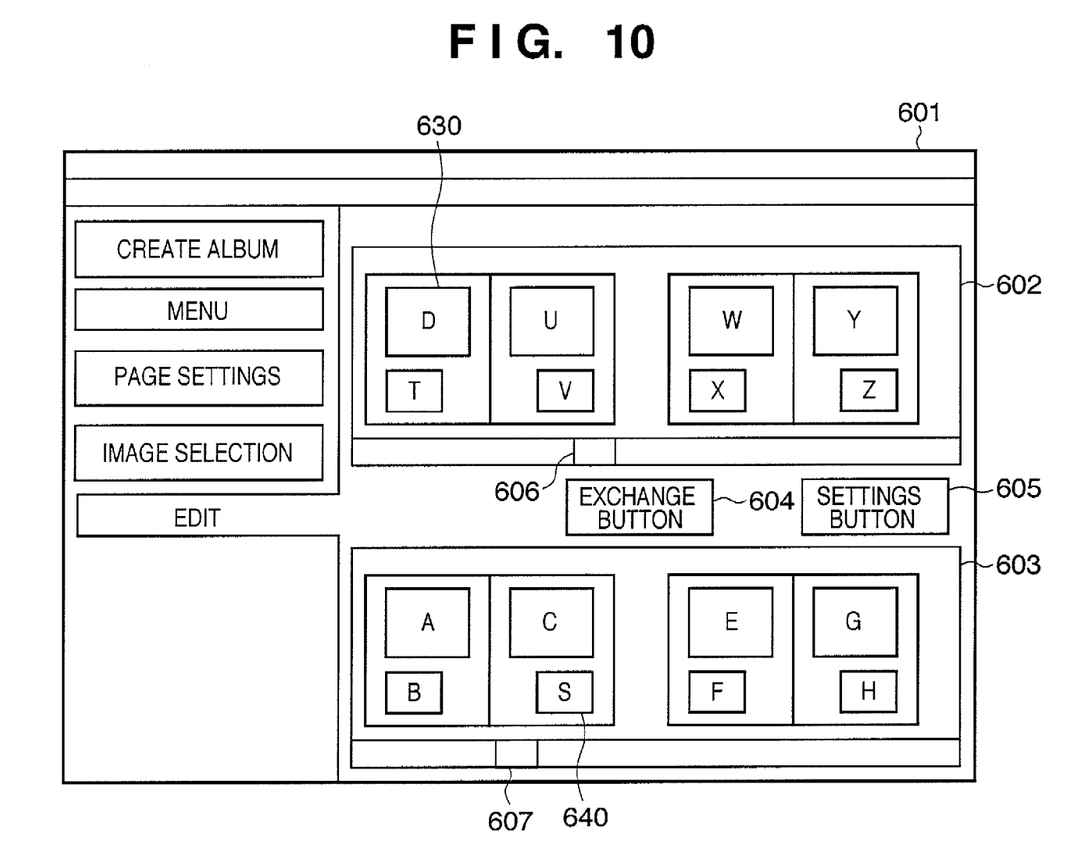
FIG. 10 is a diagram showing a GUI screen after image exchange processing according to the second embodiment of the present invention.

FIG. 10 shows a state after exchanging image S 610 and image D 620 displayed by the editing area display controller 206 in FIG. 5 with "attribute information exchange". In FIG. 10, image S 640 inherits the size and rotation of the image D 620 before exchange. Similarly, image D 630 inherits the size and rotation of the image S 610 before exchange.

Figure 11A:
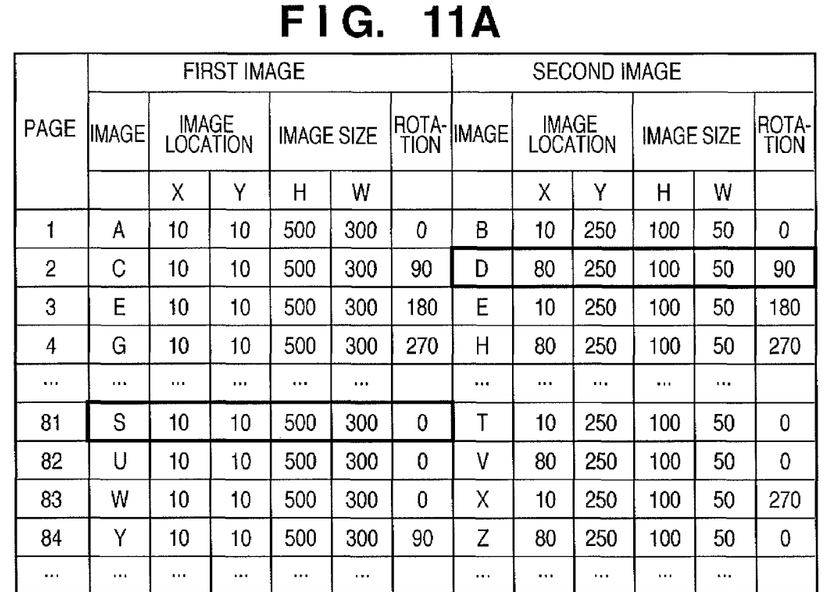
FIGS. 11A and 11B are diagrams showing examples of information management table structures according to the second embodiment of the present invention.
Figure 11B:
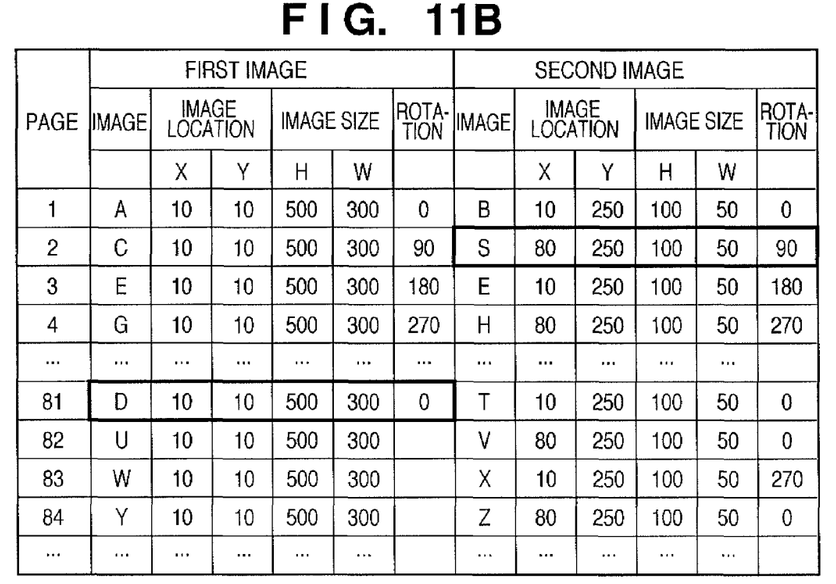

FIG. 11A and FIG. 11B show information tables of the images in the pages stored in the data information storage unit 204 when exchanging with "attribute information exchange", holding information pertaining to the location on the page and the image size for each image. FIG. 11A shows a state of the information table before exchange, in which information pertaining to with multiple images S, T, . . . displayed in the first page editing area 602 and multiple images A, B, C, D, . . . displayed in the second page editing area 603 is stored.

Results of revision by exchange with "attribute information exchange" are shown in FIG. 11B. In other words, image D that was the second image in page 2 in FIG. 11A and image S that was the first image in page 81 have been exchanged, with image S becomes the second image in page 2 and image D becomes the first image in page 81. Here, in the second embodiment, unlike in the first embodiment, the information on "image size" and "rotation information" in the tables before exchange is retained as is. Then, reflecting the state of the table shown in FIG. 11B, display like that shown in FIG. 10 is accomplished through the data controller 202 and the display controller 201 to complete the exchange process performed by the exchanger 209, with an electronic album in which not only the locations of image S and image D but also the attribute information have been exchanged and displayed as the display result.

Although the foregoing description uses at least the size of the image and the rotation information as the target of attribute information, the present invention is not limited thereto. Thus, a wide variety of attribute information, including data names, data locations, memos attached to images, trimming information, dates, image sensing information and the like, can be exchanged using the same method.

Thus, as described above, when exchanging the display locations of images in an electronic album, the second embodiment allows the user to selectively execute whether to exchange or not to exchange the attribute information.

(Third Embodiment)

Next, in a third embodiment, a description is given of displaying images in an electronic album after exchange in such a way as to identify which images have been exchanged. A detailed description of the processes executed by the image processing apparatus (computer 102) according to the third embodiment follows, with reference to the flow chart shown in FIG. 8.

First, in step S17 and step S18, the image processing apparatus (computer 102) stores in a temporary storage area the positions of images exchanged when a process of exchanging images in the electronic album is carried out, and outlines the images at those positions and displays them on the display device 210 in that outlined state through the display controller 201 so as to distinguish them from other images.

Figure 12:
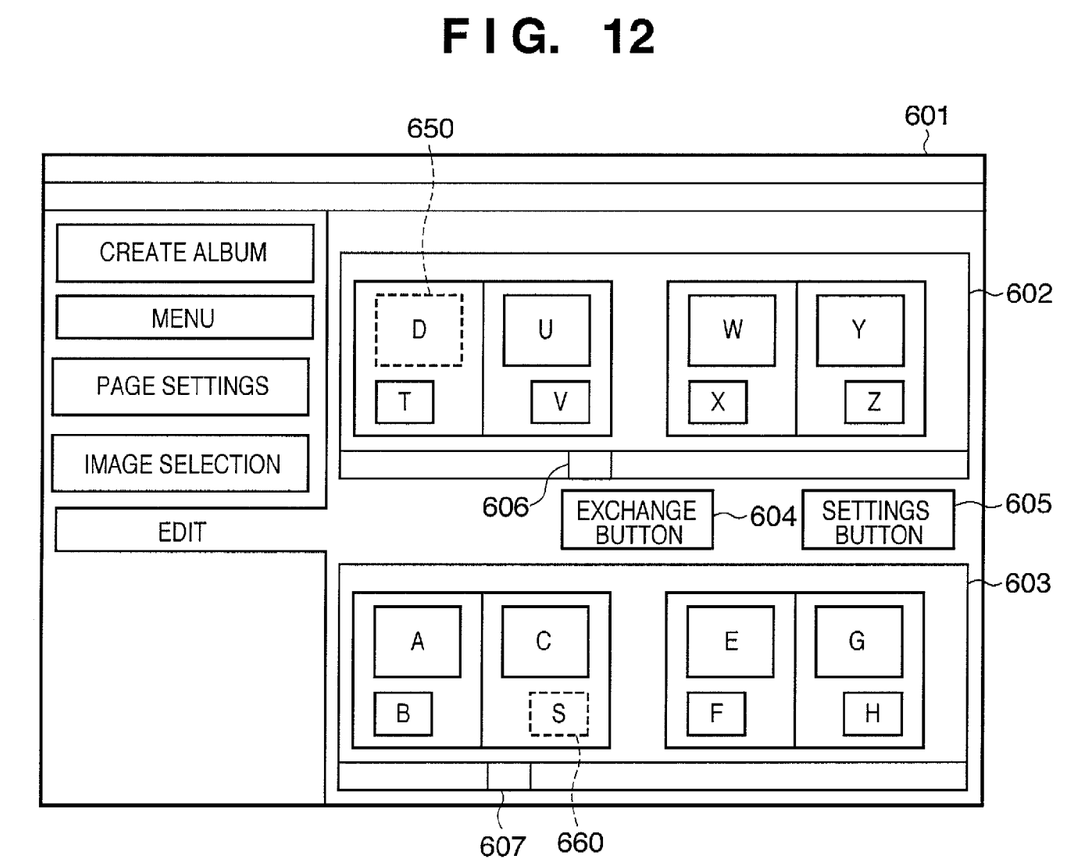
FIG. 12 is a diagram showing a GUI screen after image exchange processing according to a third embodiment of the present invention.

FIG. 12 shows a state in which an exchange of an image S 660 and an image D 650 is displayed on the display device 210 by the editing area display controller 206, in which each exchanged image is outlined and thereby distinguished.

Although the foregoing description is of a case in which the image is outlined and displayed, alternatively, the exchanged images may be displayed inside a dialog box.

Additionally, instead of an outline, the exchanged images may be marked and displayed.

Thus, as described above, the third embodiment displays exchanged images in an electronic album so as to distinguish them from other images, enabling the user to easily identify which images have been exchanged.

It should be noted that, in the first through third embodiments described above, where a list of images in an electronic album are displayed, the screen is divided into upper and lower areas (vertically) and the plurality of images arranged left to right (horizontally). However, the present invention is not limited to such an arrangement, and alternatively the screen may be divided into right and left areas (horizontally) and the plurality of images displayed top to bottom (vertically). In addition, it goes without saying that there may be three or more of this displayed plurality of areas. Further, when deciding in which direction to display, the paper data 3100 in the electronic album data 3000 may be checked. Thus, if the paper orientation is vertical, the screen may be divided "vertically", and if the paper orientation is horizontal, then the screen may be divided "horizontally".

In addition, what is described above concerning the image data of images such as photographs and graphics is also applicable to frames when editing moving image data of a moving image in units of frames.

Note that the invention can be implemented by supplying a software program, which implements the functions of the foregoing embodiments, directly or indirectly to a system or apparatus, reading the supplied program code with a computer of the system or apparatus, and then executing the program. In such a case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In such a case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, and optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client the computer can be connected to a website on the Internet using a browser of the client computer, in the computer program of the present invention or an automatically installable compressed file of the program can be downloaded to a recording medium such as a hard disk. Further, the program of the present invention can be supplied by dividing the program code constituting the program into a plurality of files and downloading files from different websites. In other words, a WWW (World Wide Web) the server then downloads, to multiple users, the program files that implements the functions of the present invention by computer is also covered by the claims of the present invention.

It is also possible to input and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-017011, filed on Jan. 26, 2007, which is hereby incorporated by reference herein in its entirety.

What is claimed is:

1. An information processing apparatus that arranges and displays on a display device a plurality of images arranged in multiple pages of an electronic album, comprising:
   a detection unit that detects a switch to a predetermined editing mode for exchanging the plurality of images arranged in the electronic album;
   a display controller that, when the switch is detected, displays in each of a first display area and a second display area of the display device one or more pages of the electronic album, wherein the first display area and the second display area are arranged next to each other and each display area is individually scrollable;
   wherein a page displayed in the first display area includes a first image and a page displayed in the second display area includes a second image;
   a selection unit that selects the first image, wherein the selected first and second images are to be exchanged with each other;

an exchange designation unit that designates exchange of the first and second images selected by the selection unit; and an editorial exchange unit to set whether or not to exchange editorial attribute information associated with the first and second images when exchanging the first and second images;

an exchange unit that, in response to an instruction from the exchange designation unit, exchanges the selected first and second images such that subsequent to the exchange, the selected first image occupies a location on the page in the second display area previously occupied by the selected second image and the selected second image occupies a location on the page in the first display area previously occupied by the selected first image, wherein the editorial attribute information associated with the first and second images is also exchanged according to the setting in the editorial exchange unit;

wherein the display controller, in response to an instruction from the exchange designation unit, displays a result of the exchange of the first and second images on the display device.

2. The information processing apparatus according to claim 1, further comprising:
wherein when the editorial attribute information is to be exchanged, the exchange unit exchanges the editorial attribute information together with the first and second images and displays the results of the application of the editorial attribute information to the exchanged images on the display device.

3. The information processing apparatus according to claim 1, wherein the editorial attribute information includes at least one of image size and rotation information.

4. The information processing apparatus according to claim 1, wherein the display controller displays the exchanged images differently from images which are not exchanged.

5. The information processing apparatus according to claim 1, wherein the display controller arranges the first and second display areas depending on a preset orientation of a paper on which each page of the electronic album is to be printed.

6. The information processing apparatus according to claim 5, wherein the display controller displays the first and second display areas aligned next to each other in a vertical direction of the display device when the orientation of the paper is portrait, and displays the first and second display areas next to each other in a horizontal direction of the display device when the orientation of the paper is landscape.

7. The information processing apparatus according to claim 1, further comprising:
a second detection unit that detects a number of pages included in the electronic album, wherein the display controller displays in each of the first and second display areas the one or more pages of the electronic album when the number of pages detected by the second detection unit is greater than a predetermined number.

8. The information processing apparatus according to claim 1, wherein a scroll bar is provided for each of the first and the second display areas, and a page or pages of the electronic album displayed in each of the first and second display areas are changed in accordance with a movement of a scroll bar.

9. An information processing method of arranging and displaying on a display device a plurality of images arranged in multiple pages of an electronic album, comprising:
detecting a switch to a predetermined editing mode for exchanging the plurality of images arranged in the electronic album;
displaying, when the switch is detected, in each of a first display area and a second display area of the display device one or more pages of the electronic album, wherein the first display area and the second display area are arranged next to each other and each display area is individually scrollable,
wherein a page displayed in the first display area includes a first image and a page displayed in the second display area includes a second image;
selecting the first image and the second image, wherein the selected first and second images are to be exchanged with each other;
designating exchange of the selected first and second images;
setting whether or not to exchange editorial attribute information associated with the first and second images when exchanging the first and second images
exchanging, in response to an instruction in the designating step, the selected first and second images such that subsequent to the exchange, the selected first image occupies a location on the page in the second display area previously occupied by the selected second image and the selected second image occupies a location on the page in the first display area previously occupied by the selected first image, wherein the editorial attribute information associated with the first and second images is also exchanged according to the setting step; and
displaying, a result of the exchange of the first and second images on the display device.

10. A non-transitory computer readable storage medium having stored thereon a program which is executable by an information processing apparatus, the program having a program code for realizing an information processing method according to claim 9.

* * * * *